United States Patent
Sah (10) Patent No.: US 8,548,703 B2
(45) Date of Patent: Oct. 1, 2013

(54) METHOD AND APPARATUS TO DETERMINE CLUTCH SLIPPAGE IN AN ELECTRO-MECHANICAL TRANSMISSION

(75) Inventor: Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

(*) Notice: Subject to any disclaimer, the term of this patent is extended or adjusted under 35 U.S.C. 154(b) by 1136 days.

(21) Appl. No.: 12/248,189

(22) Filed: Oct. 9, 2008

(65) Prior Publication Data

US 2009/0112428 A1    Apr. 30, 2009

Related U.S. Application Data

(60) Provisional application No. 60/982,848, filed on Oct. 26, 2007.

(51) Int. Cl.
*G07F 7/00* (2006.01)
*G07F 17/00* (2006.01)
*G07F 19/00* (2006.01)

(52) U.S. Cl.
USPC ............... 701/67; 701/68; 903/912; 903/914; 903/946; 477/8; 477/12; 477/14; 477/39; 477/70

(58) Field of Classification Search
USPC ................. 903/906, 909–919, 945, 946, 947; 477/5, 6, 8–14, 15–20, 39, 57, 62–65, 70–91; 701/51, 53, 54, 57–61, 67, 68
See application file for complete search history.

(56) References Cited

U.S. PATENT DOCUMENTS

| | | | |
|---|---|---|---|
| 5,807,209 A * | 9/1998 | Matsubara et al. | 477/176 |
| 6,832,148 B1 | 12/2004 | Bennett | |
| 6,868,318 B1 | 3/2005 | Cawthorne | |
| 7,154,236 B1 | 12/2006 | Heap | |
| 2003/0153429 A1 * | 8/2003 | Boll | 477/6 |
| 2004/0229728 A1 * | 11/2004 | Oshima et al. | 477/176 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |

(Continued)

OTHER PUBLICATIONS

Kotwicki, "Dynamic Models for Torque Converter Equipped Vehicles", SAE Technical Paper Series, International Congress and Exposition, Detroit MI, Feb. 22-26, 1982, pp. 103-117.*

*Primary Examiner* — Jeffrey Shapiro (57) ABSTRACT

A method to determine excessive clutch slippage in a transmission coupled to an engine and an electric machine adapted to selectively transmit power to an output member through selective application of torque-transfer clutches includes monitoring rotational velocities of the electric machine, engine and output member, monitoring a transmission operating range state, determining a clutch slip based upon monitored rotational velocities for one of the torque-transfer clutches intended to be synchronized based upon the transmission operating range state, and indicating a runaway slip event if the clutch slip is in excess of a threshold slip level through a threshold slip duration.

13 Claims, 4 Drawing Sheets

(56) References Cited

U.S. PATENT DOCUMENTS

| | | |
|---|---|---|
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1* | 4/2009 | Heap et al. ............... 701/67 |
| 2009/0112429 A1* | 4/2009 | Sah et al. ............... 701/68 |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |

| | | | | | |
|---|---|---|---|---|---|
| 2009/0118920 A1 | 5/2009 | Heap | 2009/0118942 A1 | 5/2009 | Hsieh |
| 2009/0118921 A1 | 5/2009 | Heap | 2009/0118943 A1 | 5/2009 | Heap |
| 2009/0118922 A1 | 5/2009 | Heap | 2009/0118944 A1 | 5/2009 | Heap |
| 2009/0118923 A1 | 5/2009 | Heap | 2009/0118945 A1 | 5/2009 | Heap |
| 2009/0118924 A1 | 5/2009 | Heap | 2009/0118946 A1 | 5/2009 | Heap |
| 2009/0118925 A1 | 5/2009 | Hsieh | 2009/0118947 A1 | 5/2009 | Heap |
| 2009/0118926 A1 | 5/2009 | Heap | 2009/0118948 A1 | 5/2009 | Heap |
| 2009/0118927 A1 | 5/2009 | Heap | 2009/0118949 A1 | 5/2009 | Heap |
| 2009/0118928 A1 | 5/2009 | Heap | 2009/0118950 A1 | 5/2009 | Heap |
| 2009/0118929 A1 | 5/2009 | Heap | 2009/0118951 A1 | 5/2009 | Heap |
| 2009/0118930 A1 | 5/2009 | Heap | 2009/0118952 A1 | 5/2009 | Heap |
| 2009/0118931 A1 | 5/2009 | Kaminsky | 2009/0118954 A1 | 5/2009 | Wu |
| 2009/0118932 A1 | 5/2009 | Heap | 2009/0118957 A1 | 5/2009 | Heap |
| 2009/0118933 A1 | 5/2009 | Heap | 2009/0118962 A1 | 5/2009 | Heap |
| 2009/0118934 A1 | 5/2009 | Heap | 2009/0118963 A1 | 5/2009 | Heap |
| 2009/0118935 A1 | 5/2009 | Heap | 2009/0118964 A1 | 5/2009 | Snyder |
| 2009/0118936 A1 | 5/2009 | Heap | 2009/0118969 A1 | 5/2009 | Heap |
| 2009/0118937 A1 | 5/2009 | Heap | 2009/0118971 A1 | 5/2009 | Heap |
| 2009/0118938 A1 | 5/2009 | Heap | 2009/0118999 A1 | 5/2009 | Heap |
| 2009/0118939 A1 | 5/2009 | Heap | 2009/0144002 A1 | 6/2009 | Zettel |
| 2009/0118940 A1 | 5/2009 | Heap | | | |
| 2009/0118941 A1 | 5/2009 | Heap | | | |

* cited by examiner

METHOD AND APPARATUS TO DETERMINE CLUTCH SLIPPAGE IN AN ELECTRO-MECHANICAL TRANSMISSION

CROSS REFERENCE TO RELATED APPLICATIONS

This application claims the benefit of U.S. Provisional Application No. 60/982,848 filed on Oct. 26, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid drive vehicle require management of numerous torque bearing shafts or devices representing connections to the above mentioned engine, electrical motors, and driveline. Various control schemes and operational connections between the various aforementioned components of the hybrid drive system are known, and the control system must be able to engage and disengage the various components in order to perform the functions of the hybrid drive system. Engagement and disengagement is known to be accomplished through the use of a transmission employing clutches. Clutches are devices well known in the art for engaging and disengaging shafts including the management of rotational velocity and torque differences between the shafts. Engagement or locking, disengagement or unlocking, operation while engaged or locked operation, and operation while disengaged or unlocked operation are all clutch states that must be managed in order for the vehicle to operate properly and smoothly.

Implications to vehicle operation related to perceptible jerks or abrupt changes to vehicle acceleration are collectively described as drivability. One source of perceptible jerks affecting drivability is slip, or relative rotational movement between the connective surfaces of a clutch. Slip occurs whenever the reactive torque transmitted through the clutch exceeds the actual torque capacity created by the applied clamping force. Clutches can be designed to operate with some level of controlled slip in asynchronous operation, or clutches can be designed to operate with little or preferably no slip in synchronous operation. This disclosure deals with clutches designed primarily for synchronous operation. Slip in a transmission in synchronous operation results in unintended loss of control within the transmission and adverse affects to drivability. Another source of perceptible jerks affecting drivability results from changes in torque from torque generative devices. Input torque from the engine and input torque from the electric machine or electric machines in a hybrid powertrain can be applied individually or cooperatively to provide output torque. However, changes in total input torque required to meet torque demand, for instance, due to a change in operator pedal position or due to a transmission operating range state shift, must be handled smoothly. Particularly difficult to manage are input torques, applied simultaneously to a transmission, with different reaction times to a control input. Based upon a single control input, the various devices can change respective input torques at different times, causing increased abrupt changes to the overall torque applied through the transmission. Abrupt and uncoordinated changes to the various input torques transmitted through a transmission can cause unnecessary perceptible changes in acceleration or jerks in the vehicle, which can adversely affect vehicle drivability.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces.

A clutch includes an input member and an output member. Both members are linked to other members within the powertrain. For example, the input member is likely to be connected to torque generative devices and the output member is likely to be connected to the output or driveline shaft. Rotation of the input and output member in relation to other rotational speeds is frequently determinable through known gear ratios dependent upon an operating range state of the transmission. A method to determine slip of clutches within a transmission based upon measured speeds within the powertrain and indicate occurrence of excessive slip would be beneficial to powertrain control.

SUMMARY

A method to determine excessive clutch slippage in an electro-mechanical transmission mechanically-operatively coupled to an internal combustion engine and an electric machine adapted to selectively transmit mechanical power to an output member through selective application of a plurality of torque-transfer clutches includes monitoring rotational velocities of the electric machine, the engine, and the output member, monitoring a transmission operating range state, determining a clutch slip based upon monitoring the rotational velocities for one of the torque-transfer clutches intended to be synchronized based upon the transmission operating range state, and indicating a runaway slip event if the clutch slip is in excess of a threshold slip level through a threshold slip duration.

BRIEF DESCRIPTION OF THE DRAWINGS

One or more embodiments will now be described, by way of example, with reference to the accompanying drawings, in which.

DETAILED DESCRIPTION

Figure 1:
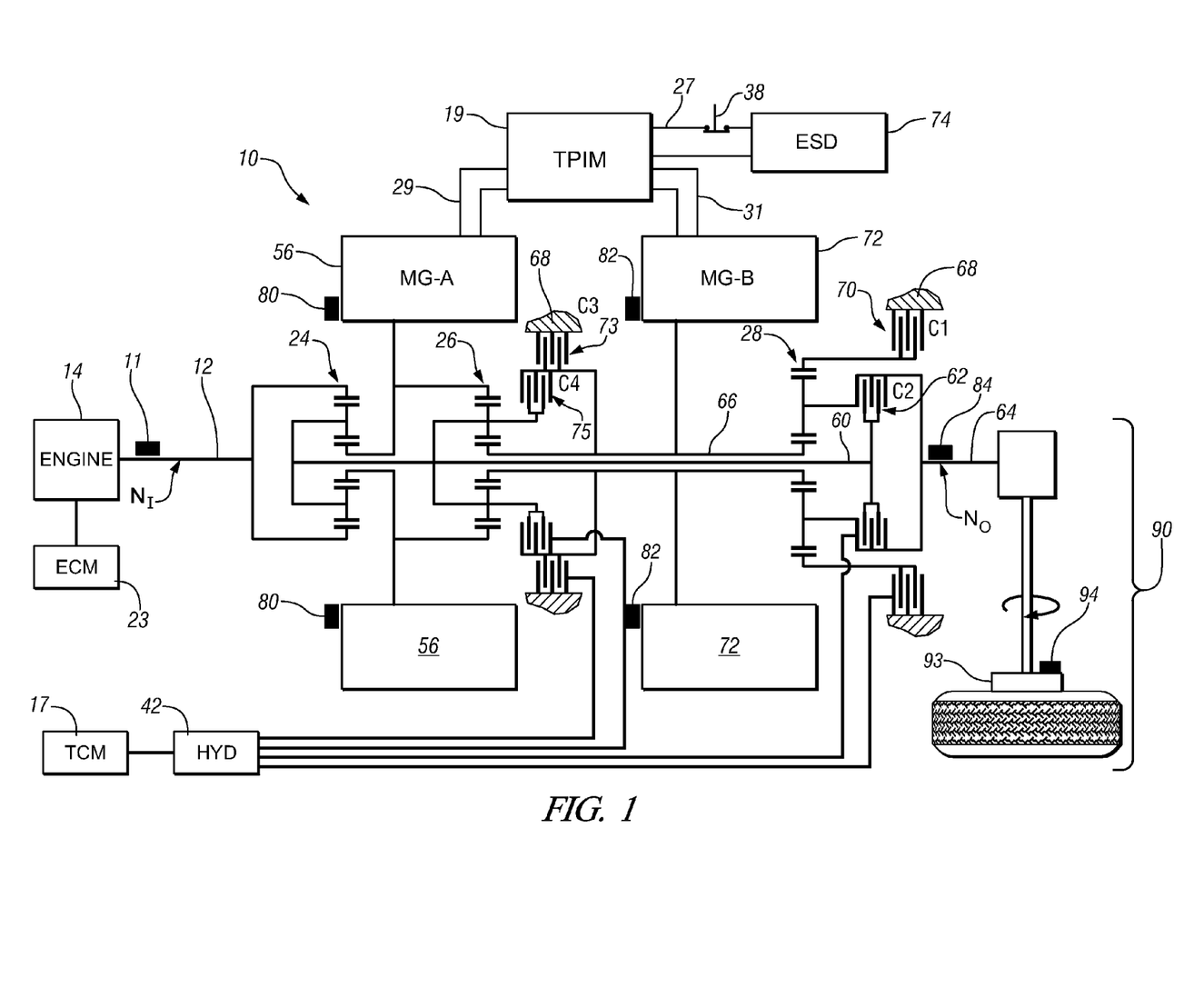
FIG. 1 is a schematic diagram of an exemplary powertrain, in accordance with the present disclosure.
Figure 2:
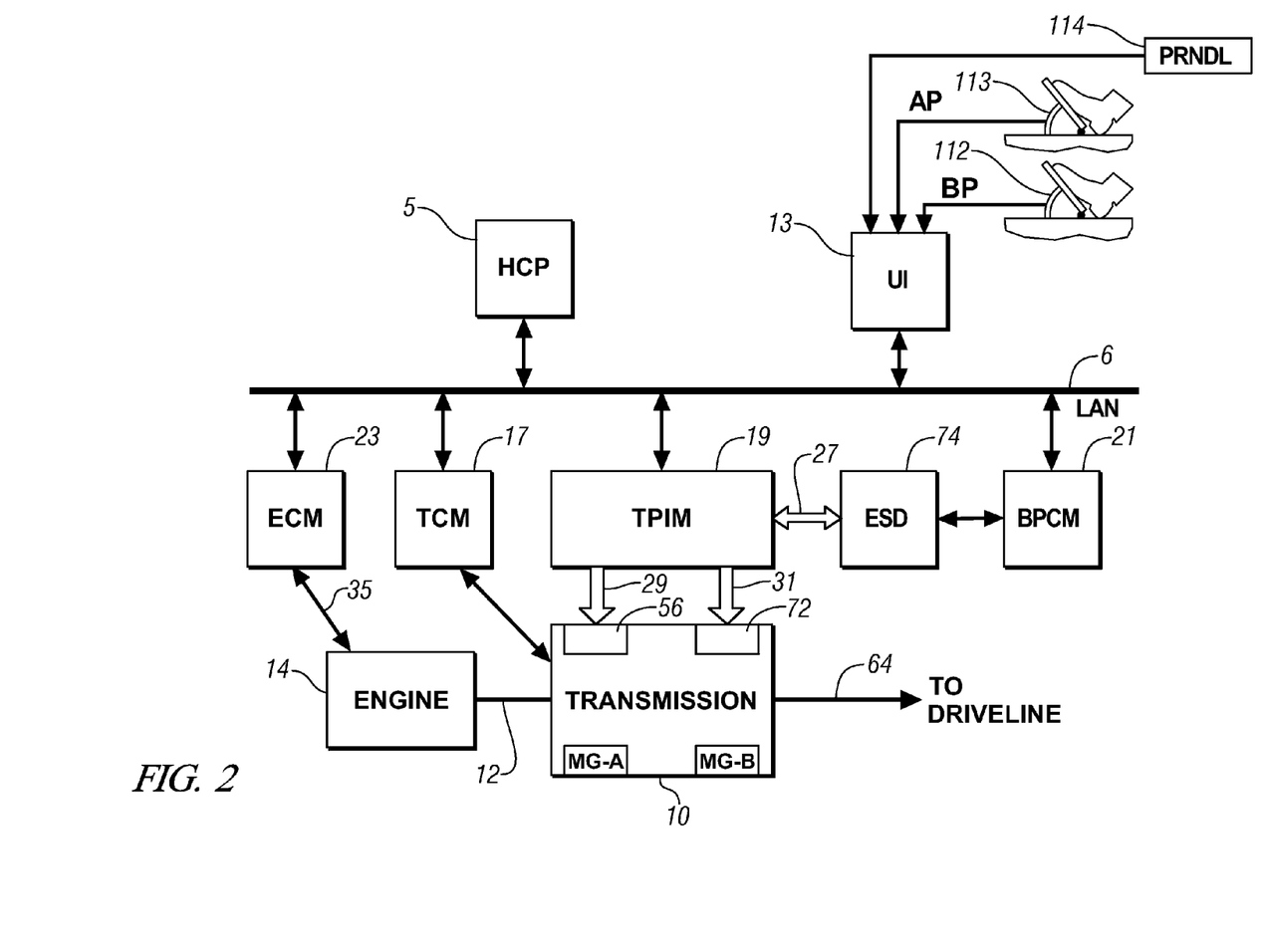
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_O$ REQ'), a commanded output torque ('TCMD') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\,MIN}$ to $P_{BAT\,MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, TCMD, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
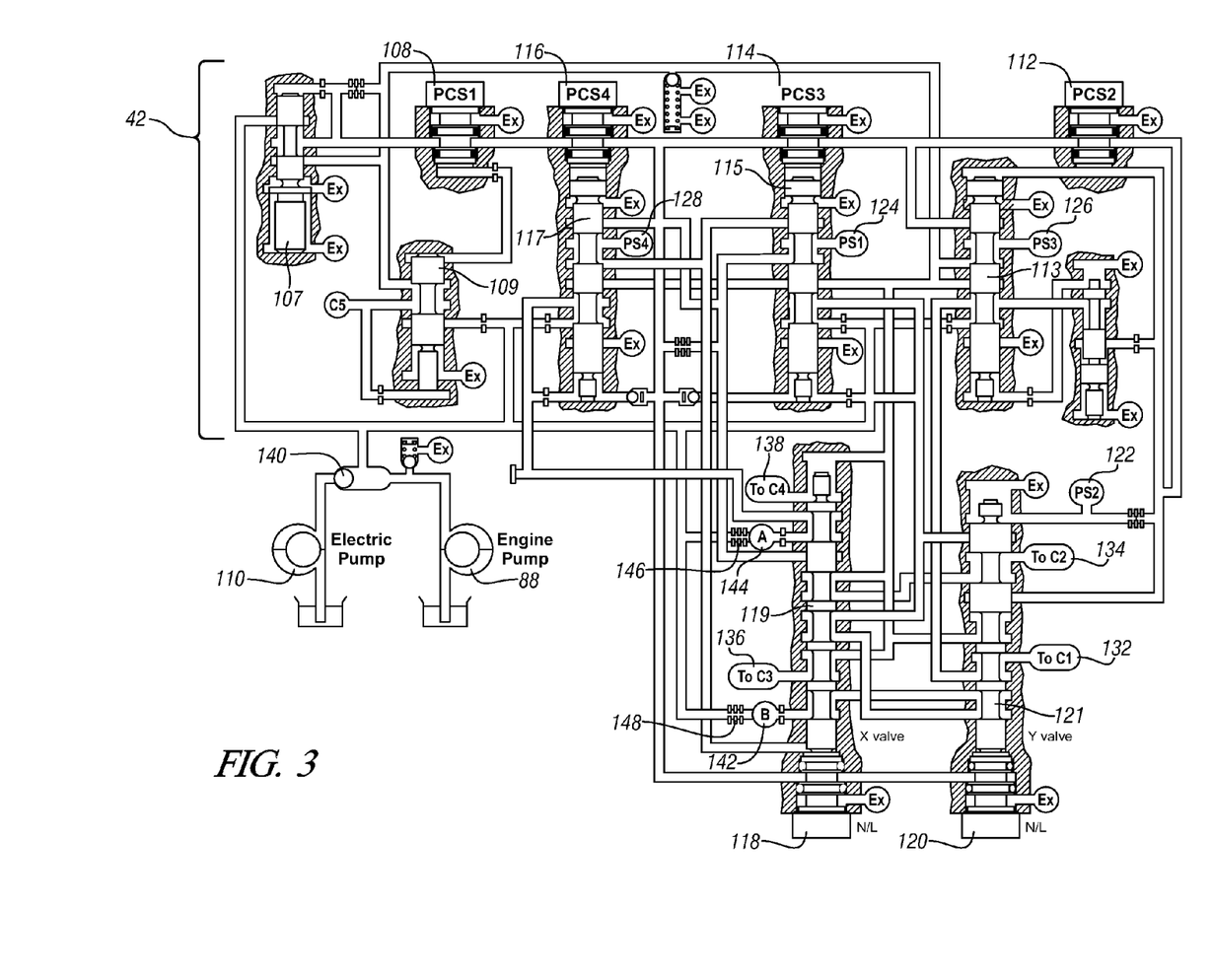
FIG. 3 is a schematic diagram of a hydraulic circuit, in accordance with the present disclosure.

FIG. 3 depicts a schematic diagram of the hydraulic control circuit 42 for controlling flow of hydraulic fluid in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PSI via passage 122.

The hydraulic control circuit 42 includes a base cooling circuit for providing hydraulic fluid to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic fluid around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic fluid to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

Figure 4:
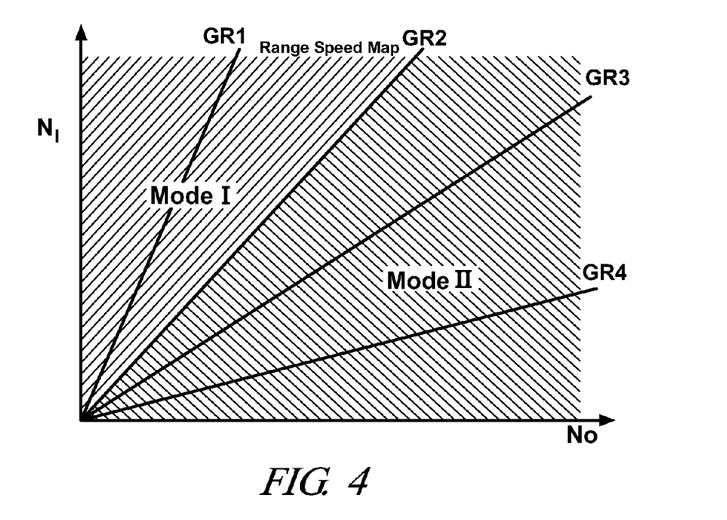
FIG. 4 illustrates gear transition relationships for an exemplary hybrid powertrain transmission, in accordance with the present disclosure.

Shifts within a transmission, such as the exemplary transmission of FIG. 1, frequently involve unloading a first clutch, transitioning through an inertia speed phase state, and subsequently loading a second clutch. Within the transmission of a conventionally powered vehicle utilizing an engine only, the change within a transmission from one fixed gear state to another fixed gear state frequently includes unloading a first clutch, allowing the vehicle to briefly coast, and then loading a second clutch. However, as described in relation to FIG. 1 and Table 1, above, clutches within a hybrid powertrain transmission are frequently applied in pairs or groups, and a shift within the transmission can involve only unloading one of the applied clutches and subsequently loading another clutch while maintaining engagement of a third clutch throughout the shift. FIG. 4 demonstrates gear transition relationships for an exemplary hybrid powertrain transmission, in particular as described in the exemplary embodiment of FIG. 1 and Table 1, in accordance with the present disclosure. $N_I$ is plotted against $N_O$. At any fixed gear state, $N_O$ is determined by the corresponding $N_I$ along the fixed gear state plots. Operation in either EVT Mode I or EVT Mode II, wherein a continuously variable gear ratio is utilized to power from a fixed input speed can take place in the respective zones illustrated on the graph. Clutch states, C1-C4, as described in the exemplary embodiment of FIG. 1, are described in Table 1. For instance, operation in a second fixed gear state requires clutches C1 and C2 to be applied or loaded and clutches C3 and C4 to be not applied or unloaded. While FIG. 4 describes gear transitions possible in the exemplary powertrain illustrated in FIG. 1, it will be appreciated by one having ordinary skill in the art that such a description of gear transitions is possible for any transmission of a hybrid powertrain, and the disclosure is not intended to be limited to the particular embodiment described herein.

FIG. 4 can describe operation of an exemplary system in a fixed gear state or EVT mode, as described above, and it can also be used to describe shift transitions between the various transmission operating range states. The areas and plots on the graph describe operation of the operating range states through transitions. For example, transitions between fixed gear states within an EVT mode region require transitory operation in the EVT mode between the fixed gear states. Similarly, transition from EVT Mode I to EVT Mode II requires a transition through the second fixed gear state, located at the boundary between the two modes.

In accordance with FIGS. 1 and 4 and Table 1, an exemplary transmission shift from a third fixed gear state to a fourth fixed gear state is further described. Referring to FIG. 4, both the beginning and the preferred operating range states exist within the area of EVT Mode II. Therefore, a transition from the third gear state to the fourth gear state requires first a shift from the third fixed gear state to EVT Mode II and then a shift from EVT Mode II to the fourth fixed gear state. Referring to Table 1, a hybrid powertrain transmission, beginning in a third fixed gear state, will have clutches C2 and C4 applied. Table 1 further describes operation in EVT Mode II, the destination of the first shift, to include clutch C2 applied. Therefore, a shift from the third fixed gear state to EVT Mode II requires clutch C4 to be changed from an applied to a not applied state and requires that clutch C2 remain applied. Additionally, Table 1 describes operation in the fourth fixed gear mode, the destination of the second shift, wherein clutches C2 and C3 are applied. Therefore, a shift from EVT Mode II to the fourth fixed gear state requires clutch C3 to be applied and loaded and requires that clutch C2 remain applied. Therefore, clutches C4 and C3 are transitioned through the exemplary shift, while clutch C2 remains applied and transmitting torque to the driveline throughout the shift event.

As described above in relation to FIG. 1, it is known to monitor rotational speeds at various places within a transmission. In the exemplary embodiment described above, sensors are located on the crankshaft connected to the engine, providing $N_I$, both electric machines, providing $N_A$ and $N_B$, and the output shaft connected to the driveline, providing $N_O$. Other rotating members internal to the transmission, member 44 of FIG. 1, for example, are not directly monitored for rotational speed. However, depending upon how many rotational speeds are known, the current operating range state, and the resulting state of clutches within the transmission, all speeds within the transmission can be determined. For example, in the exemplary transmission of FIG. 1, if the transmission is assumed to be in a neutral state wherein all clutches are assumed not applied, the rotational speed of all members internal to the transmission can be determined based upon known rotational speeds among three of the linearly independent speeds from $N_I$, $N_A$, $N_B$, and $N_O$. If in the same exemplary transmission, the transmission is assumed to be in an operating range state wherein one clutch is applied, such as EVT Mode I and II described above, then more is known of the internal state of the transmission due to the applied and locked clutch. As described above, a synchronized and locked clutch has little or no slip, and the speed of the involved member not directly monitored by a sensor can be assumed based upon the speed of the involved member directly monitored by a sensor. As a result, the rotational speed of all members internal to the transmission can be determined based upon known rotational speeds among two of the linearly independent speeds from $N_I$, $N_A$, $N_B$, and $N_O$. Further, if in the same exemplary transmission, the transmission is assumed to be in an operating range state wherein two clutches are applied, such as in the fixed gear states described above, then even more is known of the rotational speeds internal to the transmission. As a result, the rotational speed of all members internal to the transmission can be determined based upon known rotational speeds among any of $N_I$, $N_A$, $N_B$, and $N_O$. Additionally, conclusions made by calculating rotational speeds internal to the transmission assuming fewer locked clutches are not incorrect when clutches are determined to be in fact locked. For example, in the exemplary transmission described above, if calculations are performed assuming the transmission is in neutral utilizing three of the above known speeds, and in fact, the transmission is in a fixed gear state with two clutches locked and synchronized, the calculations performed with the neutral assumption will still be substantially correct.

Rotational velocities of various members within the transmission are commonly monitored. For instance, $N_I$, input speeds from an electric machine or machines ($N_A$ and $N_B$, in the exemplary embodiment described above), and $N_O$ are typically monitored. The speed of a spinning shaft, such as is measured for $N_I$ and $N_O$, is known to be measured by different methods in the art. For example, a Hall effect sensor utilizing alternating magneto-resistance is known to count revolutions in the shaft. Alternatively, the speed of an electric machine such as an electric motor can be determined by the operation of the motor through a device known in the art as a resolver. As will be appreciated by one having ordinary skill in the art, a resolver frequently measures a motor speed with greater accuracy than devices utilized to measure spinning shaft speeds, and, therefore, measurements from a resolver are known to be preferable in order to provide more accurate results. As will be appreciated by one having ordinary skill in the art, different methods of collecting data will include different sampling rates, require different forms of filtering, and includes numerous implications including different filtering constants and frequency response behavior. Utilizing data from different sensor types together for calculations will require the data to be processed according to methods known in the art in order to be in comparable forms appropriate for comparison and calculation.

It will be noted by one having ordinary skill in the art that the above relationships of known rotational speeds to rotational speeds of other unknown members within the transmission depends upon how many degrees of freedom exist within the transmission. In the above described exemplary embodiment of FIG. 1, assuming the transmission to be in a neutral operating range state, the transmission is said to have three degrees of freedom. In such an instance, the speed of any member within the transmission can be determined based upon the known rotational speeds of three members. Depending upon the particular embodiment, not every member can serve as one of the three members will generate the desired result, and such discrimination of the inputs requires analysis of the particular embodiment and the particular connections within the transmission utilized. In the same exemplary embodiment, assuming the transmission to be a state with one clutch applied, the transmission is said to have two degrees of freedom. In such an instance, the speed of any member within the transmission can be determined based upon the known rotational speeds of two select members. In the same exemplary embodiment, assuming the transmission to be a state with two clutches applied, the transmission is said to have one degree of freedom. In such an instance, the speed of any member within the transmission can be determined based upon the known rotational speeds of one select member. It will be appreciated that transmissions can be utilized with various clutch configurations and operating range state dependencies. A determination of a number of degrees of freedom within the transmission allows a determination of known rotational velocities of members within the transmission required to fully determine rotational velocities within the transmission.

Slip, or relative rotational movement between connective surfaces of the clutch when the clutch connective surfaces are intended to be synchronized, occurs whenever a reactive torque transmitted through the clutch exceeds an actual torque capacity created by applied clamping force. Slip in a transmission results in unintended loss of torque control within the transmission, results in loss of engine speed and electric machine speed control caused by a sudden change in output torque from the transmission, and results in sudden changes to vehicle acceleration, creating adverse affects to drivability. Therefore, clutch slip is an important term to monitor in order to enable adequate clutch control and remediation of slip events.

The operating range state of a clutch being monitored is important to measuring clutch slip across that clutch. Clutch slip is clearly important in cases where a clutch is intended to be synchronized or locked. Clutch slip is also clearly less important or measured for different reasons in cases where a clutch is intended to be unlocked and the two members of the clutch are intended to be desynchronized. Depending upon the particular clutch being employed, slip during a locking or unlocking event can be either allowable to some degree or undesirable. Therefore, any method to determine clutch slip across a clutch must include a determination of the intended clutch operating range state or the current transmission shift being performed, and an indication of expected or acceptable relative rotational velocities of the members of the clutch in that intended operating range state or shift state.

As described above, the rotational speeds of various members internal to the transmission can be determined based upon rotational speeds of members monitored directly by sensors and by assumed relationships describing clutch states. Clutch slip can be determined by calculating the relative rotational speeds of two involved members spanning the clutch. A method is disclosed to determine clutch slip in a hybrid powertrain transmission containing a plurality of torque-transfer clutches.

Figure 5:
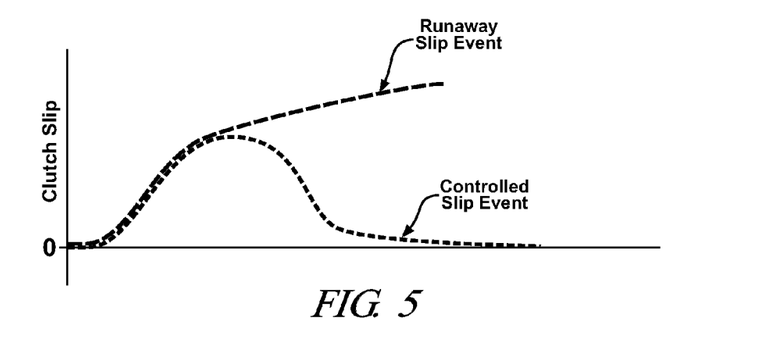
FIG. 5 graphically illustrates exemplary measurements of clutch slip, in accordance with the present disclosure.

FIG. 5 graphically illustrates exemplary measurements of clutch slip, in accordance with the present disclosure. While slip is an undesirable occurrence within a hybrid transmission, slip can occur as a result of nearly instant or transitory effects, such as a vehicle hitting a large bump or undergoing a harsh braking event, that do not cause sustained slip. In such controlled slip events, the effects of the slip upon drivability are contained and any reaction to recover from the slip are unlikely to take effect in time to have any impact on clutch slip already back under a threshold level. Instead, slip remediation and control reactions to recover from slip are desired in cases of runaway slip events, where some sustained condition is causing slip in excess of a threshold level for longer than a threshold duration.

Figure 6:
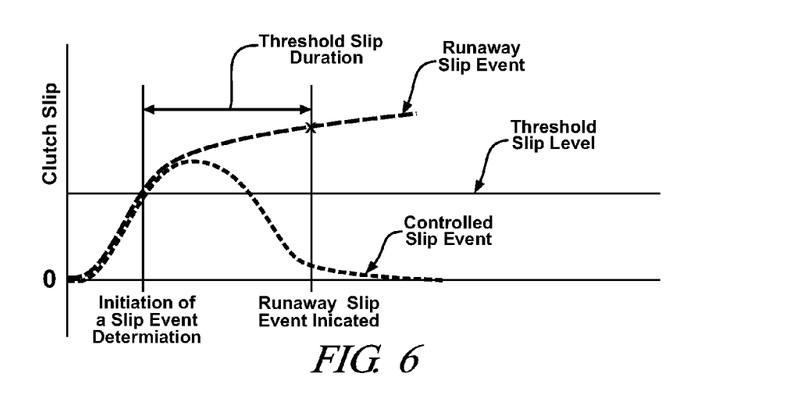
FIG. 6 graphically illustrates exemplary measurements of clutch slip, applying a method to determine a runaway clutch slip event, in accordance with the present disclosure.

FIG. 6 graphically illustrates exemplary measurements of clutch slip, applying a method to determine a runaway clutch slip event, in accordance with the disclosure. The same exemplary slip data from FIG. 5 is depicted, representing an exemplary runaway slip event and an exemplary controlled slip event. A determination of a runaway slip event is illustrated in FIG. 6. A threshold slip level, selected as a rotational velocity magnitude between the connected members of the involved clutch, is indicated, and once measured slip exceeds the threshold slip level, a slip event determination is initiated. After a threshold slip duration, selected to indicate an slip event occurring for more than a transitory or substantially instantaneous duration, a measured slip value is again compared to the threshold slip level. If this comparison yields a measured slip value below the threshold slip level, then a controlled slip event is indicated. If the comparison yields a measured slip value above the threshold slip level, then a runaway slip event is indicated. In this way, measured slip values can be used to determine whether a runaway slip event is occurring across a clutch, such that reactions to control the slip event are warranted.

One exemplary process utilizing the aforementioned method to evaluate slip through a clutch is described herein. Clutch slip assuming a neutral operating range state can be calculated continuously and used to verify conditions for the calculations for mode1 and mode2. Assuming a multi-clutch transmission wherein the speed of clutch one ($N_{C1}$) in the current operating range state is expected to be zero indicating a synchronized or locked clutch. Additionally, based upon the configuration of the transmission, it is determined that the speeds of two electric machines operative to provide input torque to the transmission ($N_A$ and $N_B$, respectively) and the speed of the output member ($N_O$) are, as three members, capable of defining all speeds internal to the transmission in a neutral operating range state, $N_{C1}$ can be determined by the following equation:

$$N_{C1} = K_1 * N_A + K_2 * N_B + K_3 * N_O \quad [1]$$

Constants $K_1$, $K_2$, and $K_3$ represent known relationships of the various members to speeds internal to the transmission particular to clutch one. In the alternative, in an embodiment with only one electric machine, $N_I$ can be substituted for $N_B$, and the corresponding constant $K_2$ adjusted to the particulars of the engine and its interaction with the transmission; however use of $N_B$ is preferable when available due to the increased accuracy of the rosolver within the electric machine in comparison to the shaft speed sensor utilized to calculate $N_I$, as described above. Speeds of other clutches within the system can similarly be determined, utilizing constants representing known relationships of the various members to speeds internal to the transmission particular to each respective clutch. This neutral range state determination can be described by the following equation.

$$\begin{bmatrix} N_{C1} \\ N_{C2} \\ N_{C3} \\ N_{C4} \end{bmatrix} = [(TransmissionConstntMatrix)] \begin{bmatrix} N_A \\ N_B \\ N_O \end{bmatrix} \quad [2]$$

If, however, a determination is made that clutch one is in a synchronized or substantially synchronized condition, for instance, $N_{C1}$ being less than some threshold value such as 100 RPM, then a single synchronized/locked clutch equation can be used to check the slip speeds of the additional clutches, as follows.

$$\begin{bmatrix} N_{C2} \\ N_{C3} \\ N_{C4} \end{bmatrix} = [(TransmissionConstntMatrix)] \begin{bmatrix} N_A \\ N_B \end{bmatrix} \quad [3]$$

Use of this equation eliminates the noise, inaccuracy, and lag associated with output speed $N_O$. Once the relative rotational velocities or slip speeds of each of the clutches are determined, they can be compared by the method above with intended slip speeds for the current operating range state or current transmission shift in progress for each clutch, and a runaway slip event for a any clutch intended to be locked or synchronized can be diagnosed based upon this comparison. Similarly, if a determination is made that two clutches are locked, then the equations given above predictably reduce to a double synchronized/locked clutch equation, dependent upon a single member speed. Such a double synchronized/locked clutch equation can be exemplified by the following equation.

$$\begin{bmatrix} N_{C2} \\ N_{C4} \end{bmatrix} = [TransmissionConstntMatrix)][N_A] \quad [4]$$

While the method described above is one exemplary embodiment capable of determining a runaway slip event, other embodiments of such a determination are possible, and the disclosure is not intended to be limited to the particular embodiments described herein. Such additional exemplary embodiments include but are not limited to measuring slip values throughout the threshold slip duration and indicating a runaway slip event only if the measured slip value exceed the threshold slip level throughout the threshold slip duration; measuring slip values through a duration, and indicating a runaway slip event based upon the average measured slip values throughout the duration; and indicating a degree of slip, based upon the magnitude of the measured slip, either indicating a runaway slip event earlier in the case of higher slip magnitudes or indicating a severe runaway slip event in the case of higher slip magnitudes. Additionally, a runaway slip event can be tracked through the subsequent reactions to control the slip event, and if an indicated runaway slip event is not controlled by the subsequent reactions, then some additional action can be suggested or controlled.

If a runaway clip event is detected, a number of different methods are known to react to the event. For instance, torque can be cut to the input devices in order to reduce the reactive torque applied across the clutch. Additionally or alternatively, routines within the various modules controlling the speeds of the various input members can be adjusted to compensate for the determined slip. Also, if a plurality of clutches are engaged, torque can be transferred from the slipping clutch to the remaining clutch or clutches until the slip event has been contained. Also, algorithms or routines controlling vehicular operation can be adjusted, limiting for example the acceleration available to the operator based upon clutch slip occurrence. Many methods for controlling or reacting to clutch slip are known in the art, and this disclosure is not intended to be limited to the particular embodiments described herein.

The above method can be performed in a separate physical device dedicated to performing the slip indication method disclosed herein. Alternatively, the above method can be performed within an algorithm or software module located physically within other devices in the vehicle, including but not limited to an ECM, a HCP, or a TCM.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a powertrain during a runaway slip event, said powertrain comprising an electro-mechanical transmission mechanically-operatively coupled to an internal combustion engine and first and second electric machines adapted to selectively transmit mechanical power to an output member through selective application of a plurality of torque-transfer clutches, the method comprising:
 performed by a control module:
  monitoring rotational velocities of said first electric machine, said second electric machine, said engine, and said output member;
  monitoring a transmission operating range state;
  identifying at least one of said torque-transfer clutches as an intended locked clutch based upon said transmission operating range state;
  determining a rotational velocity of each of two members of said intended locked clutch based upon said monitored rotational velocities and said transmission operating range state comprising
   when the transmission operating range state is an operating range state having none of said clutches locked, assuming the transmission to have three degrees of freedom to determine the rotational velocities of the members of said intended locked clutch based upon three of said monitored rotational velocities,
   when the transmission operating range state is an operating range state having one of said clutches locked, assuming the transmission to have two degrees of freedom to determine the rotational velocities of the members of said intended locked clutch based upon two of said monitored rotational velocities, and
   when the transmission operating range state is an operating range state having two of said clutches locked, assuming the transmission to have one degree of freedom to determine the rotational velocities of the members of said intended locked clutch based upon one of said monitored rotational velocities;

determining a clutch slip of said intended locked clutch based upon said rotational velocities of said members; and indicating said runaway slip event if said clutch slip is in excess of a threshold slip level through a threshold slip duration; and controlling said powertrain based upon said indicated runaway slip event;

wherein each of said engine and said first and second electric machines simultaneously transmit torque independently to said transmission through separate inputs, each separate input to the transmission being exclusive to respective ones of said engine, said first electric machine and said second electric machine; and wherein said rotational velocities of said engine and said first and second electric machines change independently.

2. The method of claim 1, wherein indicating said runaway slip event if said clutch slip is in excess of said threshold slip level through said threshold slip duration comprises:

initiating a slip event determination when said clutch slip is in excess of said threshold slip level; and indicating said runaway slip event if after said threshold slip duration said clutch slip remains in excess of said threshold slip level.

3. The method of claim 1, wherein indicating said runaway slip event if said clutch slip is in excess of said threshold slip level through said threshold slip duration comprises:

initiating a slip event determination when said clutch slip is in excess of said threshold slip level; and indicating said runaway slip event if said clutch slip remains in excess of said threshold slip level throughout said threshold slip duration.

4. The method of claim 1, wherein said assuming the transmission to have three degrees of freedom to determine the rotational velocities of the members of said intended locked clutch based upon three of said monitored rotational velocities comprises utilizing a neutral operating range state equation utilizing said rotational velocities of said first electric machine, said engine, and said output member in coordination with known relationships within said transmission to determine said clutch slip.

5. The method of claim 1, wherein said assuming the transmission to have three degrees of freedom to determine the rotational velocities of the members of said intended locked clutch based upon three of said monitored rotational velocities comprises utilizing a neutral operating range state equation utilizing said rotational velocities of said first electric machine, said second electric machine, and said output member in coordination with known relationships within said transmission to determine said clutch slip.

6. The method of claim 1, wherein said assuming the transmission to have two degrees of freedom to determine said rotational velocities of said members of said intended locked clutch based upon two of said monitored rotational velocities comprises utilizing a single synchronized/locked clutch equation utilizing said rotational velocities of said electric machine and said second electric machine in coordination with known relationships within said transmission to determine said clutch slip.

7. The method of claim 1, wherein said assuming the transmission to have one degree of freedom to determine the rotational velocities of the members of said intended locked clutch based upon one of said monitored rotational velocities comprises utilizing a double synchronized/locked clutch equation utilizing said rotational velocity of one of said electric machines in coordination with known relationships within said transmission to determine said clutch slip.

8. The method of claim 6, further comprising indicating said runaway slip event if said rotational velocities of said members of said intended locked clutch are in excess of said threshold slip level through a respective clutch threshold slip duration for the corresponding said intended locked torque-transfer clutch.

9. The method of claim 5, further comprising determining clutch slips for each of the remaining ones of said torque-transfer clutches by utilizing a single synchronized/locked clutch equation utilizing said rotational velocities of said electric machine and said second electric machine in coordination with known relationships within said transmission to determine said second clutch slip.

10. Method to determine clutch slippage in an electro-mechanical transmission mechanically-operatively coupled to an internal combustion engine, a first electric machine, and a second electric machine adapted to selectively transmit mechanical power to an output member through selective application of a plurality of torque-transfer clutches, the method comprising:

performed by a control module:

monitoring rotational velocities of said first electric machine, said second electric machine, said engine, and said output member;

monitoring a transmission operating range state;

identifying at least one of said torque-transfer clutches as an intended locked clutch based upon said transmission operating range state;

determining a rotational velocity of each of two members of each of said intended locked clutches based upon said rotational velocities and said transmission operating range state comprising when the transmission operating range state is an operating range state having none of said clutches locked, assuming the transmission to have three degrees of freedom to determine the rotational velocities of the members of said intended locked clutch based upon three of said monitored rotational velocities, when the transmission operating range state is an operating range state having one of said clutches locked, assuming the transmission to have two degrees of freedom to determine the rotational velocities of the members of said intended locked clutch based upon two of said monitored rotational velocities, and when the transmission operating range state is an operating range state having two of said clutches locked, assuming the transmission to have one degree of freedom to determine the rotational velocities of the members of said intended locked clutch based upon one of said monitored rotational velocities;

determining a clutch slip of each of said intended locked clutches based upon said determined rotational velocities;

initiating a slip event determination when said clutch slip for one of intended locked clutches is in excess of a threshold slip level; and indicating a runaway slip event if after a threshold slip duration said clutch slip remains in excess of said threshold slip level; and controlling one of said transmission, said engine, and said electric machines based upon said indicated runaway slip event;

wherein each of said engine and said electric machines simultaneously transmit torque independently to said transmission through separate inputs, each input to the transmission being exclusive to respective ones of said engine, said first electric machine and said second electric machine; and wherein said rotational velocities of said engine and said electric machines change independently.

11. The method of claim 10, wherein said assuming the transmission to have three degrees of freedom to determine the rotational velocities of the members of said intended locked clutch based upon three of said monitored rotational velocities comprises utilizing a neutral operating range state equation utilizing said rotational velocities of said first electric machine, said second electric machine, and said output member in coordination with known relationships within said transmission to determine said clutch slip.

12. Apparatus to control a powertrain during a runaway slip event, said powertrain comprising an electro-mechanical transmission mechanically-operatively coupled to an internal combustion engine, a first electric machine, and a second electric machine adapted to selectively transmit mechanical power to an output member through selective application of a plurality of torque-transfer clutches, the apparatus comprising:

sensors located to measure rotational velocities of said first electric machine, said second electric machine, said engine, and said output member; and a slip indication module including programming to monitor said rotational velocities of said first electric machine, said second electric machine, said engine, and said output member, monitor a transmission operating range state, identify at least one of said torque-transfer clutches as an intended synchronized clutch based upon said transmission operating range state, determine a rotational velocity of each of two members of said intended synchronized clutch based upon said rotational velocities and said transmission operating range state comprising when the transmission operating range state is an operating range state having none of said clutches synchronized, assuming the transmission to have three degrees of freedom to determine the rotational velocities of the members of said intended synchronized clutch based upon three of said monitored rotational velocities, when the transmission operating range state is an operating range state having one of said clutches synchronized, assuming the transmission to have two degrees of freedom to determine the rotational velocities of the members of said intended synchronized clutch based upon two of said monitored rotational velocities, and when the transmission operating range state is an operating range state having two of said clutches synchronized, assuming the transmission to have one degree of freedom to determine the rotational velocities of the members of said intended locked clutch based upon one of said monitored rotational velocities, determine a clutch slip based upon said determined rotational velocities, indicate a runaway slip event if said clutch slip is in excess of a threshold slip level through a threshold slip duration, and control one of said transmission, said engine, and said electric machines based upon said indicated runaway slip event;

wherein each of said engine and said electric machines simultaneously transmit torque independently to said transmission through separate inputs, each separate input to the transmission exclusive to respective ones of said engine, said first electric machine and said second electric machine; and wherein said rotational velocities of said engine and said electric machines change independently.

13. The apparatus of claim 12, wherein the assuming the transmission to have three degrees of freedom to determine the rotational velocities of the members of said intended synchronized clutch based upon three of said monitored rotational velocities includes a neutral operating range state equation utilizing said rotational velocities of said electric machine, said second electric machine, and said output member in coordination with known relationships within said transmission to determine said clutch slip.

* * * * *